(12) United States Patent
D'Souza

(10) Patent No.: US 6,173,324 B1
(45) Date of Patent: Jan. 9, 2001

(54) METHOD AND APPARATUS FOR FAULT DETECTION AND ISOLATION IN DATA

(75) Inventor: Kevin L. D'Souza, Bensalem, PA (US)

(73) Assignee: AT&T Corp, New York, NY (US)

( * ) Notice: Under 35 U.S.C. 154(b), the term of this patent shall be extended for 0 days.

(21) Appl. No.: 09/116,129

(22) Filed: Jul. 15, 1998

(51) Int. Cl.[7] .................................................. G06F 15/173
(52) U.S. Cl. .............................................. 709/224; 714/53
(58) Field of Search ................................. 712/1; 709/238, 709/242, 249, 250, 224; 714/42, 53; 710/105

(56) References Cited

U.S. PATENT DOCUMENTS

| | | | |
|---|---|---|---|
| 5,249,184 | * | 9/1993 | Woest ................................... 370/85.8 |
| 5,430,727 | * | 7/1995 | Callon ................................. 370/85.13 |
| 5,490,252 | * | 2/1996 | Macera ................................... 709/249 |
| 5,881,051 | * | 3/1999 | Arrowood ............................. 370/248 |
| 5,917,820 | * | 6/1999 | Rekhter ................................. 370/392 |
| 5,953,312 | * | 9/1999 | Crawley ................................ 370/218 |
| 5,991,264 | * | 11/1999 | Croslin ................................. 370/225 |
| 6,003,090 | * | 12/1999 | Puranik ................................ 709/235 |
| 6,006,264 | * | 12/1999 | Colby ................................... 709/226 |
| 6,047,329 | * | 4/2000 | Horikawa ............................. 709/238 |
| 6,064,979 | * | 5/2000 | Perkowski ............................. 705/26 |
| 6,101,538 | * | 8/2000 | Brown .................................. 709/223 |

* cited by examiner

Primary Examiner—Eric Coleman
(74) Attorney, Agent, or Firm—Robert D. Levy

(57) ABSTRACT

A processor (21) monitors a data network (10) to proactively detect customer connectivity troubles by actively monitoring each router ($18_1$ and $18_2$) to determine new and missing route destinations, Border Gateway Protocol (BGP) sessions and Open Shortest Path First (OSPF) adjacencies, by execution of three sub-routines rtchk(22), bgpchk (24) and ospfchk (26), respectively. Upon detecting a new or missing route destination, BGP session or OSPF adjacency, the processor alerts those responsible for maintaining the network of such an error.

17 Claims, 10 Drawing Sheets

FIG. 6

*Rotated flowchart content:*

Top flow (from FIG. 5 via D):
- 112: GET NEXT BGP SESSION FROM REFERENCE FILE
  - NO BGP SESSION → TO FIG. 5
  - BGP SESSION → 114: EXITS IN CURRENT FILE ?
    - YES → back to 112 (NO BGP SESSION path)
    - NO → 116: ALARM (MISSING BGP SESSION) → 118: DELETE BGP SESSION FROM REFERENCE FILE → back to 112

Bottom flow (24) (FROM FIG. 5 via C):
- 92: GET NEXT BGP SESSION FROM CURRENT FILE
  - NO BGP SESSION → (up to top flow)
  - BGP SESSION → 94: EXITS IN REFERENCE FILE ?
    - YES → E, TO FIG. 7
    - NO → 96: ALARM (NEW BGP SESSION) → 98: ADD BGP SESSION TO REFERENCE FILE → back to 92

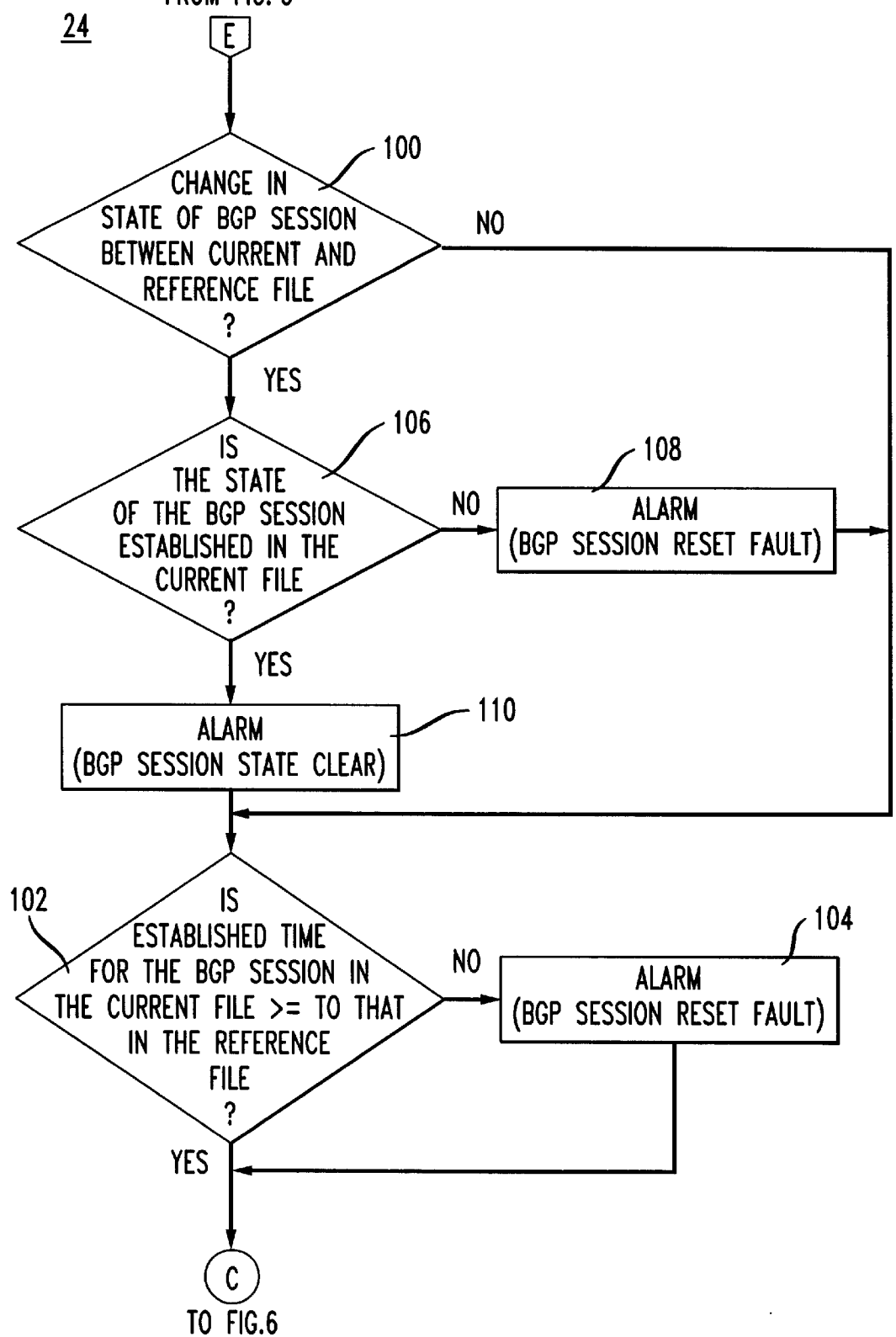

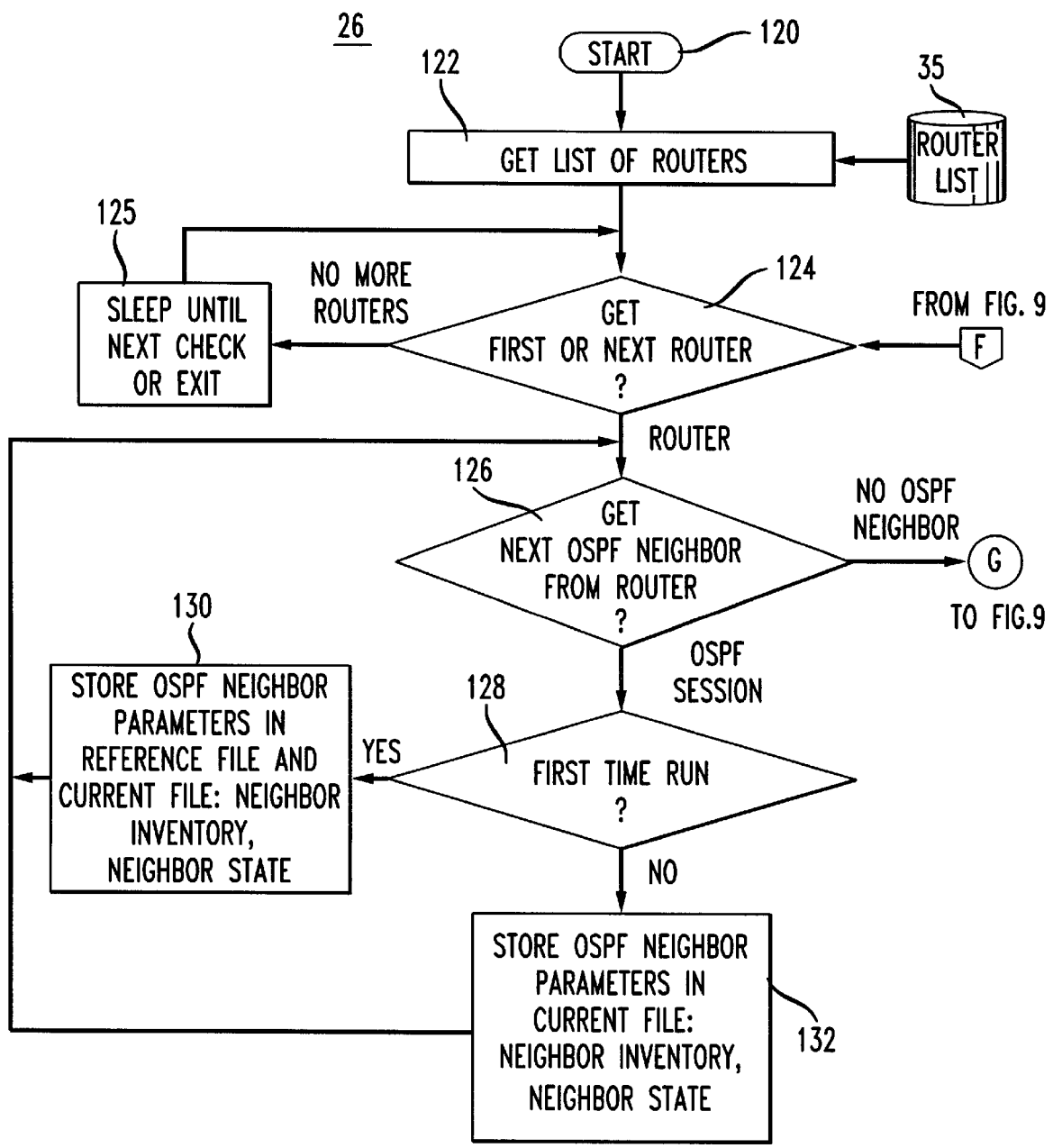

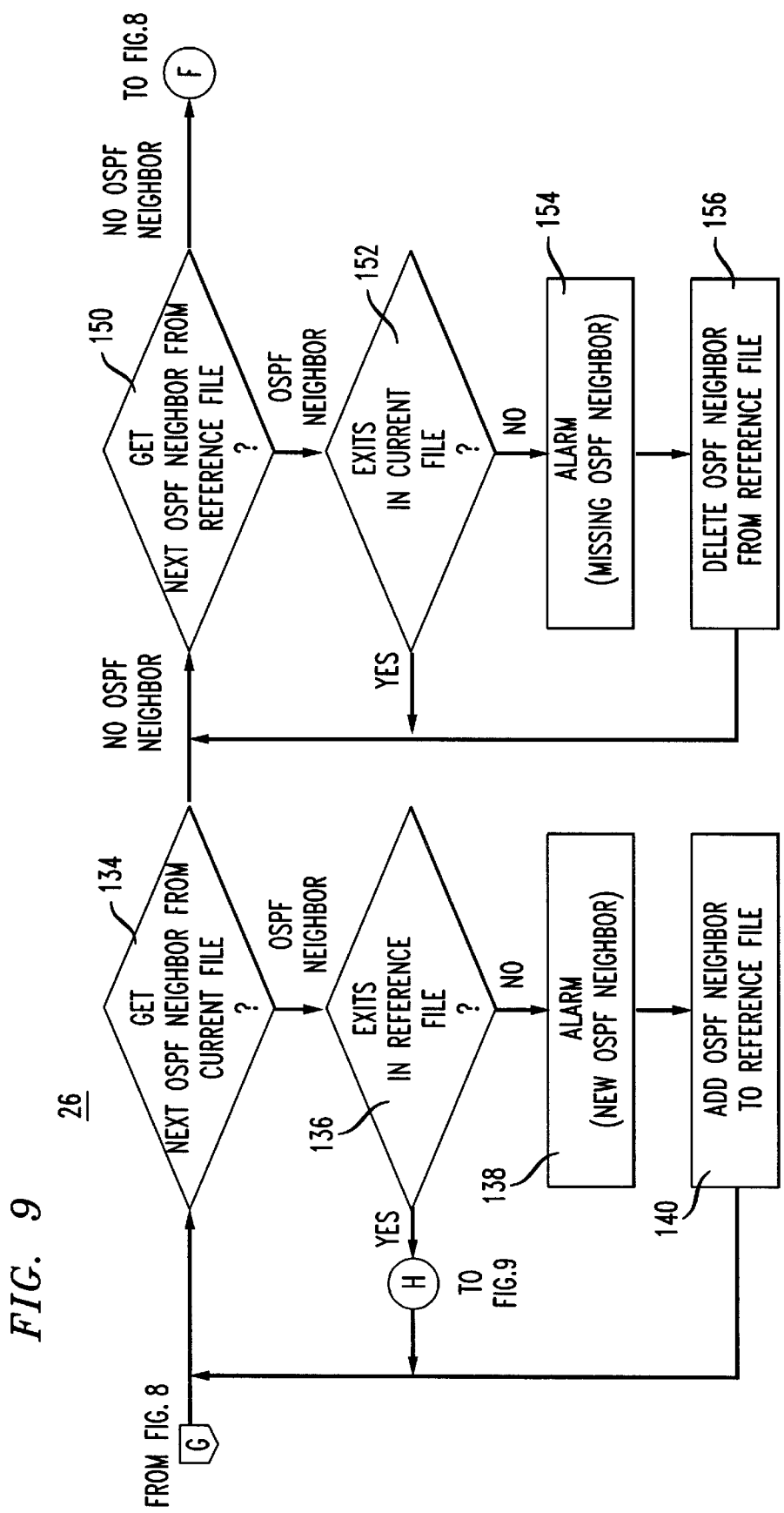

METHOD AND APPARATUS FOR FAULT DETECTION AND ISOLATION IN DATA

TECHNICAL FIELD

This invention relates to a technique for proactively detecting and isolating connectivity troubles in high-speed data networks.

BACKGROUND ART

Present day data networks typically comprise routers or other types of switches that route customer data packets over one or more links (e.g., virtual circuits) between a data source (e.g., a customer's computer connected to the data network) and destination. Successful routing of customer data packets requires that a logical path (a collection of one or more links) exist in the network between the source and destination for that packet. Based on the contents of its routing table, each router along the path ascertains from the data packet it receives the identity of the downstream router (or data destination) to receive the packet. Assuming the network possesses sufficient physical redundancy (e.g., multiple routers, multiple links), the network can dynamically redefine paths using protocols such as the Border Gateway Protocol (BGP) or Open Shortest Path First (OSPF) protocol, in case of a router or link failure. The use of such protocols ensures that no one router or link failure disrupts the flow of packets between a data source and destination.

Numerous commercial monitoring systems presently exist for detecting the operating status of routers. However, such systems typically provide local monitoring of the routers themselves, focusing on whether the routers successfully responded to a connectivity test request. Because current data networks enjoy redundancy (i.e., multiple physical paths may potentially exist between any data source and destination), one or more router failures do not necessarily indicate a customer connectivity trouble. Such present day monitoring systems ignore a key requirement for customer connectivity, namely that a path must exist between a prescribed data source and data destination, as indicated by contents of each routing table. Typically, such prior art monitoring systems often falsely notified the network manager (i.e., the individual(s) responsible for network oversight) of a customer connectivity trouble, requiring the network manager probe the network further. Often, the network manager had to spend large amounts of time to determine the cause of the customer connectivity trouble. In the past, most network managers used a non-deterministic monitoring methodology to determine customer connectivity failures. Often, a customer would detect the trouble first before the network manager, usually leading to customer dissatisfaction.

Thus, there is need for a technique for detecting and isolating customer connectivity troubles.

BRIEF SUMMARY OF THE INVENTION

Briefly, the present invention provides a technique for detecting and isolating connectivity troubles in a data network that includes links extending between routers that collectively route traffic across the links between at least one data source and at least one data destination in accordance with routing information contained in the routing table in each router. In accordance with the invention, the routing table in each router is checked to determine if there are any missing routes. In other words, the routing tables are checked to determine whether collectively, a path exists across one or more routers between a prescribed data source and data destination. If no such path exists, then the network manager is notified to investigate and correct the problem. Upon detecting a missing route, a check is also made to determine whether the failure occurred as a result of a Border Gateway Protocol (BGP) failure or an Open Shortest Path First (OSPF) failure. Upon either type of failure the network manager is notified to undertake an investigation to determine and correct such a failure.

BRIEF DESCRIPTION OF THE DRAWINGS

FIGS. 5–7 collectively illustrate the steps of a sub-routine for monitoring for BGP sessions; and FIGS. 8–10 collectively illustrate the steps of a sub-routine for monitoring the state of OSPF adjacencies.

DETAILED DESCRIPTION

Figure 1:
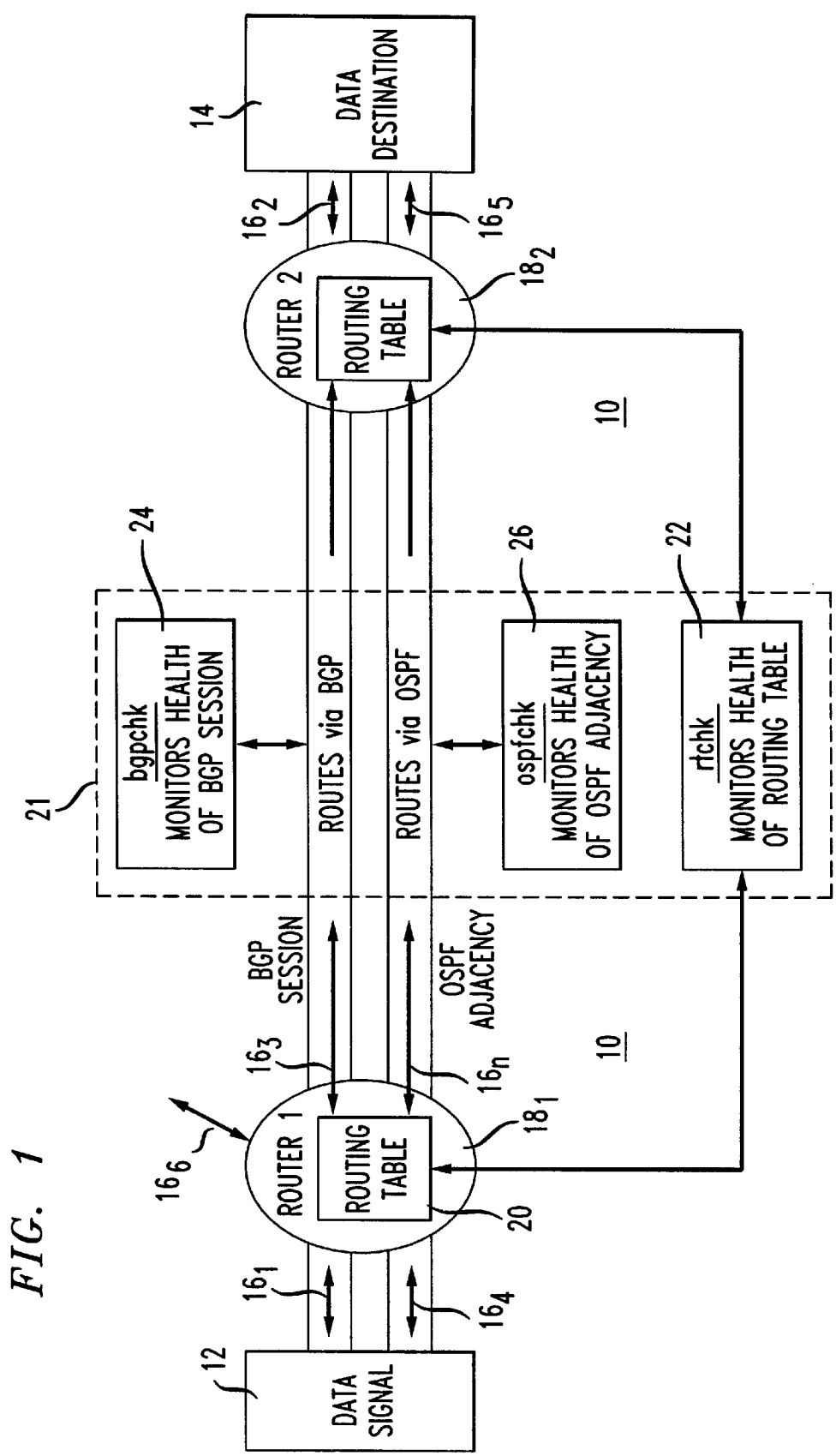
FIG. 1 depicts a block schematic diagram of a data network in accordance with a preferred embodiment of the invention.

FIG. 1 depicts a data network 10 in accordance with a preferred embodiment of the invention for transporting data packets (not shown) between a data source 12 and a data destination 14, both of which may comprise computers or the like. The network 10 includes a plurality of links $16_1$, $16_2$...$16_n$ where n is an integer. At least one link, e.g., link $16_1$ connects the data source 12 to a first router $18_1$, while at least one other link, e.g. link $16_2$, couples the data destination 14 to a second router $18_2$. At least one other link, such as link $16_3$, couples the router $18_1$, to the router $18_2$. Although not shown, the network 10 may include additional routers (not shown) interconnected via additional links that carry data packets through the network. Therefore a packet injected into the network at router $18_1$ via data source 12, may traverse multiple routers and their corresponding link interconnections, before getting to the data destination 14.

To facilitate transmission of a data packet from the data source 12 to the data destination 14 through the network 10, the routers, such as routers $18_1$ and $18_2$, each possesses a routing table 20 that identifies the other routers connected thereto by a corresponding one of the links $16_1$–$16_n$. Upon receipt of a data packet, the recipient router, say router $18_1$, examines the destination information contained in the packet. (In accordance with established protocols, each packet contains a header that specifies, among other information, the destination of the packet.) From knowledge of the ultimate packet destination, the router $18_1$ consults its routing table to determine the next router, say $18_2$, on a path that will carry the packet to its destination. Upon initialization of the network 10, as well as upon other network changes (e.g., the addition or deletion of any router, addition or deletion of any link), the routers communicate with each other to learn the manner in which they are interconnected. In this way, a router, such as router $18_1$, upon receipt of a data packet specifying a particular destination, can establish the next router on the path to route the data packet. As will be discussed below, the routers may use either the Border Gateway Protocol (BGP) or the Open Shortest Path First (OSPF) protocol to establish routes for data packets.

Although present data networks, such as network 10, may enjoy physical redundancy (in the form of possible multiple paths between the source 12 and destination 14), such physical redundancy does not necessarily insure that the network can necessarily route a packet to its specified destination. For example, a change in the routing table of one of the routers $18_1$ and $18_2$ could prevent the corresponding router from properly routing the packet to its ultimate destination (e.g., failure of a BGP Session could cause some of the routing table entries to be deleted, preventing the router from forwarding packets to that destination).

In accordance with the invention, the network 10 of FIG. 1 includes a monitoring system 21 that monitors the routers in the network to proactively detect and isolate customer connectivity faults. The monitoring system 21 comprises at least one processor for executing three sub-routines rtchk 22, bgpchk 24 and ospfchk 26. As discussed below, the sub-routine rtchk 22 monitors the health of the routing tables in the network routers. The second sub-routine bgpchk 24 monitors the Border Gateway Protocol sessions. The third sub-routine ospfchk 26 monitors the Open Shortest Path First adjacencies. In practice, the monitoring system 21 comprises one processor, but may include three separate processors, each executing a separate one of the rtchk, bgpchk, and ospfchk sub-routines 22, 24, and 26, respectively.

Figure 2:
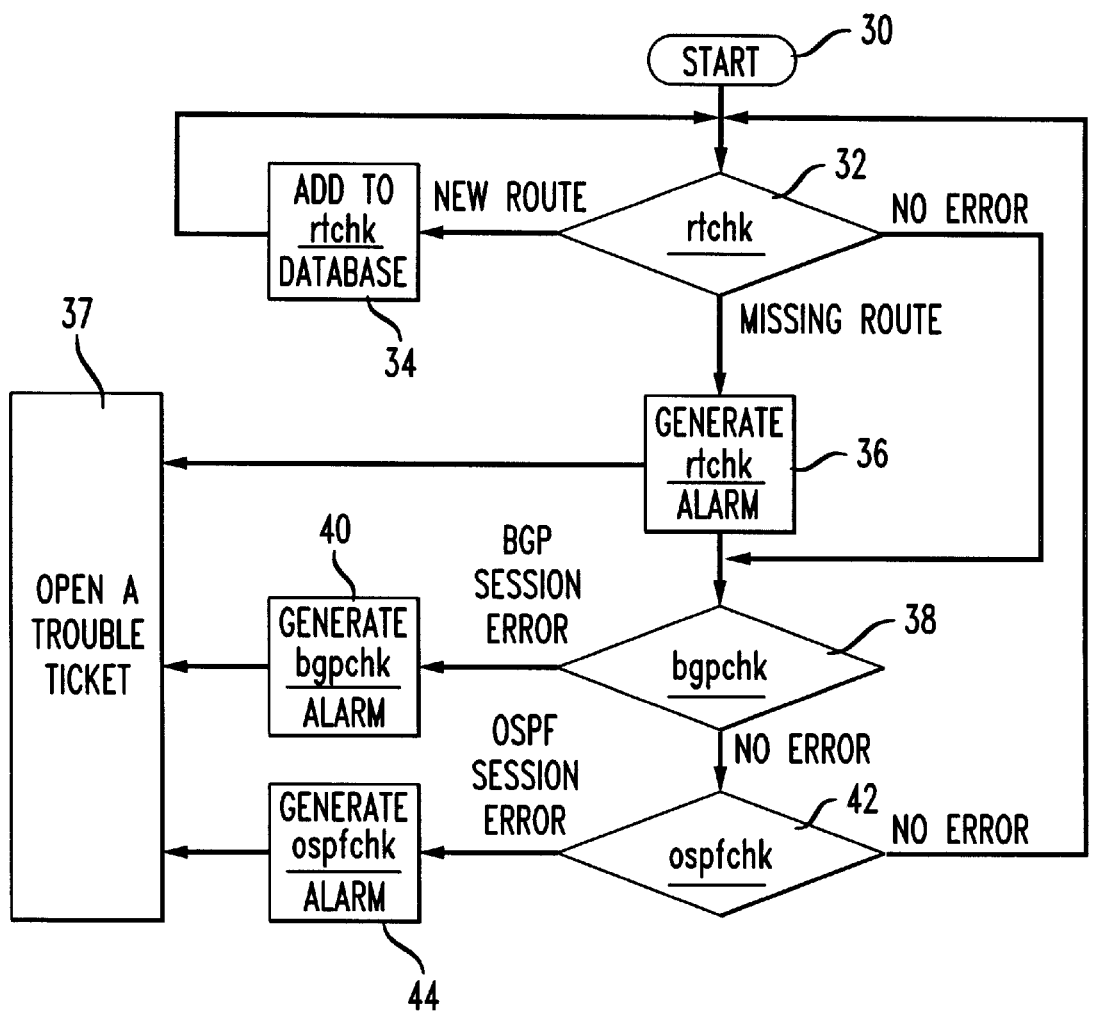
FIG. 2 illustrates in flow chart form the steps of the method of the invention for detecting and isolating connectivity troubles in the network of FIG. 1.

FIG. 2 illustrates, in flow chart form, the general process by which the monitoring system 21 detects and isolates defects that may impact customer connectivity. The monitoring system 21 of FIG. 1 commences the process of FIG. 2 upon execution of a start instruction (step 30) that causes the monitoring system to initialize and reset itself. Thereafter, the monitoring system 21 executes the rtchk sub-routine 22 to monitor the routing table 20 (see FIG. 1) in each of the routers in the network, such as the routers $18_1$ and $18_2$ of FIG. 1. As discussed in greater detail with respect to FIGS. 3 and 4, the rtchk sub-routine 22 of FIG. 1 determines whether the entries in the routing table of each router are complete. In other words, the rtchk sub-routine determines whether the routing tables collectively provide at least one path between the source of data 12 of FIG. 1 and the data destination 14 of FIG. 1. If, during execution of the rtchk routine during step 32 of FIG. 2, a new route is found, then that route is added during step 34 to a rtchk database 35 of FIG. 3 maintained by the monitoring system 21 of FIG. 1. An informational alarm is then generated to inform the network manager that a new route has been added. Upon finding a missing route during step 32 of FIG. 2, the monitoring system 21 generates a rtchk alarm during step 36 of FIG. 2, prompting the network manager to open a trouble ticket (step 37).

After step 36 of FIG. 2, or following step 32 when no new route or missing route is detected, then the monitoring system 21 of FIG. 1 executes the bgpchk sub-routine 24 of FIG. 1 during step 38 of FIG. 2 to monitor the status of the BGP sessions. As explained in greater detail with respect to FIG. 5–7, BGP sessions are a mechanism by which the network routers, such as the routers $18_1$–$18_2$ of FIG. 1, exchange route information. During execution of the bgpchk sub-routine during step 38 of FIG. 2, the monitoring system 21 monitors the state of BGP sessions, that is, new or deleted sessions, whether any session has been reset and the status of the BGP sessions (i.e., "established" or otherwise). Upon its initial execution, the bgpchk sub-routine 24 of FIG. 1 captures a full list of BGP sessions and their status. During each subsequent execution, the bgpchk sub-routine 24 captures the current BGP sessions and their status and then compares that information to the information captured previously. Upon finding a missing session, a new session, or a session status other than "established", the bgpchk sub-routine 24 of FIG. 1 generates a bgpchk alarm during step 40, prompting the network manager to open a trouble ticket (step 37).

Once step 38 of FIG. 2 is completed, the monitoring system 21 of FIG. 1 executes step 42 of FIG. 2 and commences execution of the ospfchk sub-routine 26 of FIG. 1. As discussed in greater detail with respect to FIGS. 8–10, the Open Shortest Path First (OSPF) protocol is another mechanism by which the network routers, such as routers $18_1$–$18_2$ of FIG. 1 exchange route information. During execution of the ospfchk sub-routine during step 42 of FIG. 2, the monitoring system 21 monitors the state of OSPF neighbor adjacencies, that is, new or deleted neighboring routers and their connection state. Upon its initial execution, the ospfchk sub-routine 26 of FIG. 1 captures a full list of OSPF neighboring routers and their adjacency state. During each subsequent execution, the ospfchk sub-routine 26 captures the current OSPF neighbors and their adjacency state and then compares that information to the information captured previously. Upon finding an adjacency state other than a "full" state, or new or missing neighboring routers, the ospfchk sub-routine 26 of FIG. 1 generates an ospfchk alarm during step 44 of FIG. 2, prompting the network manager to open a trouble ticket (step 37). Should no error be found during step 42, then step 32 is re-executed.

Figure 3:
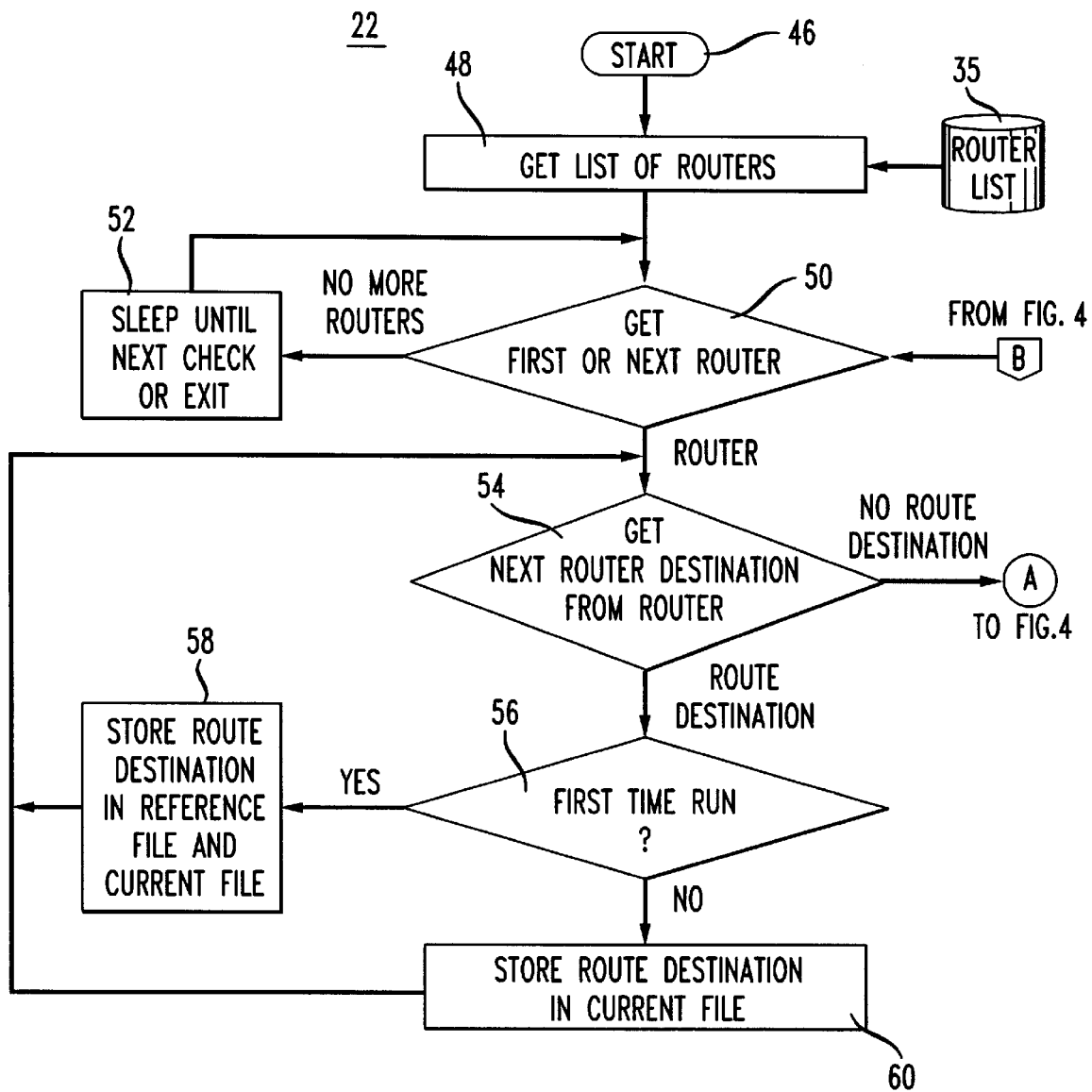
FIGS. 3–4 collectively illustrate the steps of a sub-routine for monitoring the routing tables in the routers of FIG. 1.
Figure 4:
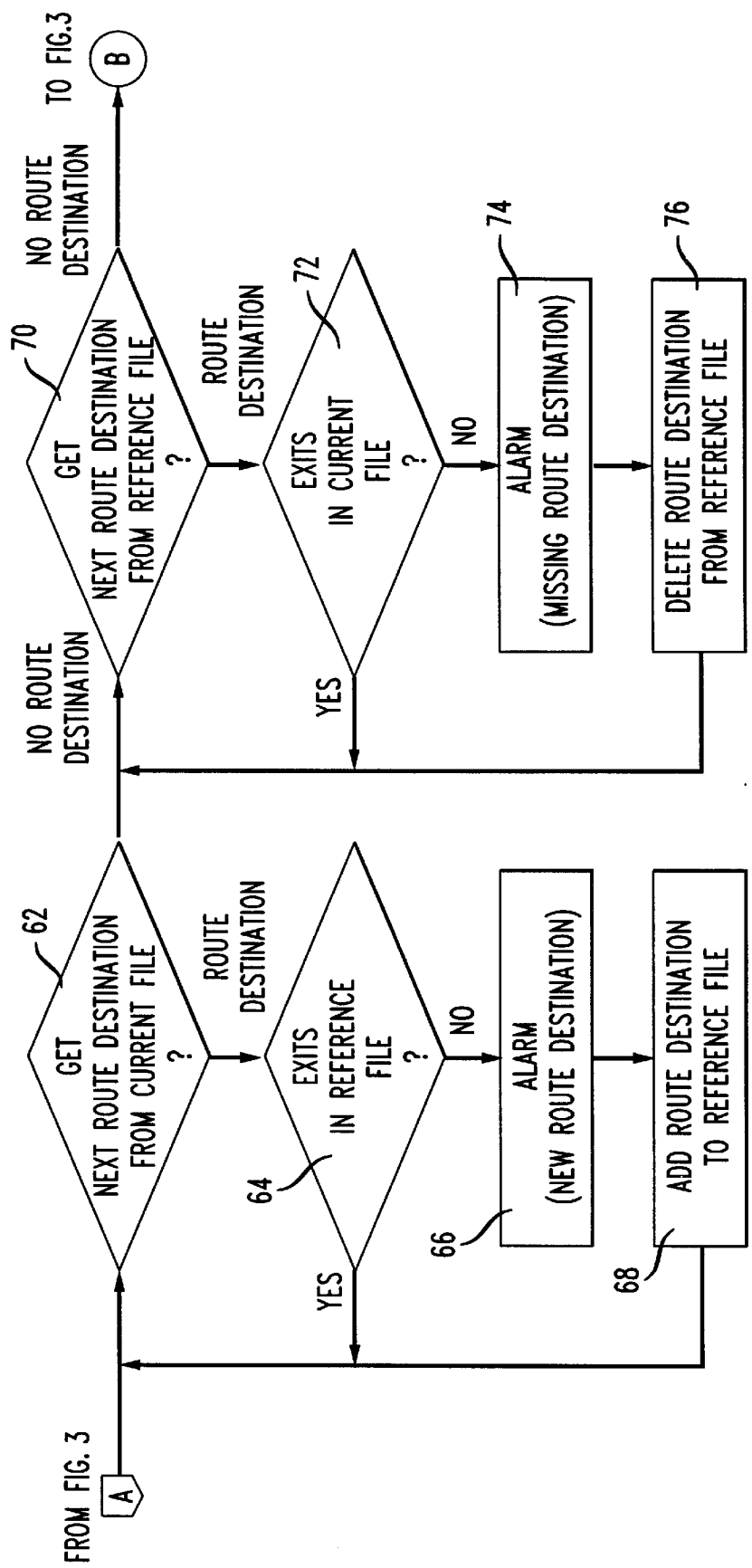

FIGS. 3 and 4, in combination, illustrate the details of the rtchk sub-routine 22 of FIG. 1. As seen in FIG. 3, the rtchk sub-routine commences upon execution of a start step (step 46). Thereafter, the monitoring system 21 of FIG. 1 executes step 48 and acquires a list of all routers in the network 10 (e.g., routers $18_1$, and $18_2$ of FIG. 1) by accessing a router list maintained in database 35. After acquiring the router list, the monitoring system 21 of FIG. 1 examines each successive router on the list during step 50. Upon initial execution of step 50, the monitoring system 21 of FIG. 1 examines the first router on the list, and upon each subsequent execution of step 50, the monitoring system examines the next listed router. If, upon execution of step 50, there are no more routers on the list, then step 52 is executed, whereupon the monitoring system 21 of FIG. 1 enters a "sleep" mode for a prescribed interval prior to re-executing step 50. (Note that the monitoring system 21 of FIG. 1 could also exit the rtchk sub-routine during step 52 of FIG. 3 if no additional routers are found.)

Following step 50 of FIG. 3 (assuming additional routers exist), then the monitoring system 21 of FIG. 1 executes step 54 and acquires the next route destination for the router examined during step 50. (Upon initial execution of step 54, the monitoring system 21 of FIG. 1 acquires the first route destination for the router undergoing examination, and upon each subsequent execution of step 54, the monitoring system acquires the next route destination for that same router.) Assuming that additional route destinations exist, then the monitoring system 21 of FIG. 1 executes step 56, whereupon the monitoring system checks whether the rtchk sub-routine is undergoing initial execution, or has been executed previously. Upon initial execution of the rtchk sub-routine, the monitoring system executes step 58 following step 56 during which the monitoring system stores the route destination acquired during step 54 in both a Reference file and in a Current file. When the monitoring system 21 of FIG. 1 is executing the rtchk sub-routine other than for the first time, then step 60 follows execution of step 56 and the monitoring system only stores the route destination in the Current file. In this way, the monitoring system can compare the destination information stored in the Current file to that stored in the Reference file to determine what router destination changes occurred after the previous execution of the rtchk sub-routine.

When the monitoring system 21 of FIG. 1 determines that there are no further router destinations during step 54 of FIG. 1 for the identified router, then program execution passes to branch "B" as illustrated in FIG. 4, whereupon the monitoring system executes step 62 of FIG. 4 and acquires the next route destination from the Current file. (Upon initial execution of step 62, the monitoring system 21 of FIG. 1 acquires the first route destination from the Current file, and upon each subsequent execution of step 62, the monitoring system acquires the next route destination from the Current file.) Following step 62, the monitoring system 21 of FIG. 1 executes step 64 of FIG. 4 and compares the route destination obtained during step 62 from the Current file to the route destinations in the Reference file. If the route destination obtained from the Current file exists in the Reference file, then step 62 is re-executed.

In case the route destination acquired during step 62 isn't found in the Reference file during step 64, then step 66 is executed, whereupon an alarm is generated, alerting the network manager of a new route. Following step 66, the monitoring system 21 of FIG. 1 adds the route destination to the Reference file during step 68 and thereafter proceeds to re-execute step 62.

As may be appreciated, during execution of the steps 62–68, the monitoring system compares the present destinations, as of the most recent execution of the rtchk sub-routine, to the route destinations recorded upon the previous execution of the rtchk sub-routine. A route destination found after initial execution of the rtchk sub-routine represents a new route that must be added to the Reference file.

Ultimately, after re-executing step 62, the monitoring system 21 of FIG. 1 will exhaust all of the route destinations in the Current file, whereupon the monitoring system executes step 70 of FIG. 4 and acquires a next route destination from the Reference file. Upon initial execution of step 70, the monitoring system 21 of FIG. 1 acquires the first route destination from the Reference file, and upon each subsequent execution of step 70, the monitoring system acquires the next route destination from the Reference file. Should no more route destinations exist in the Reference file, then the monitoring system 21 follows branch "A" and returns to step 50 of FIG. 3. Following step 70 of FIG. 4, the monitoring system 21 of FIG. 1 checks during step 72 whether the route destination acquired during step 70 from the Reference file exists in the Current file. If the route destination exists, then the monitoring system re-executes step 70. If the route destination acquired during step 70 from the Reference file does not exist in the Current file, then following step 72 of FIG. 4, the monitoring system 21 of FIG. 1 generates an alarm (step 74) to alert the network manager of a missing route. Thereafter, the monitoring system 21 of FIG. 1 deletes the route designation from the Reference file (step 76) since the route designation presumably no longer exists.

As may be appreciated, during steps 70–76 of FIG. 4, the monitoring system 21 of FIG. 1 compares the route destinations in the Reference file to the route destinations in the Current file. Any route destination in the Reference file that does not exist in the Current file implies a missing route destination that will give rise to an alarm. A missing route destination implies that destination is unreachable across the network 10 of FIG. 1, and in-turn implies a customer connectivity problem.

Figure 5:
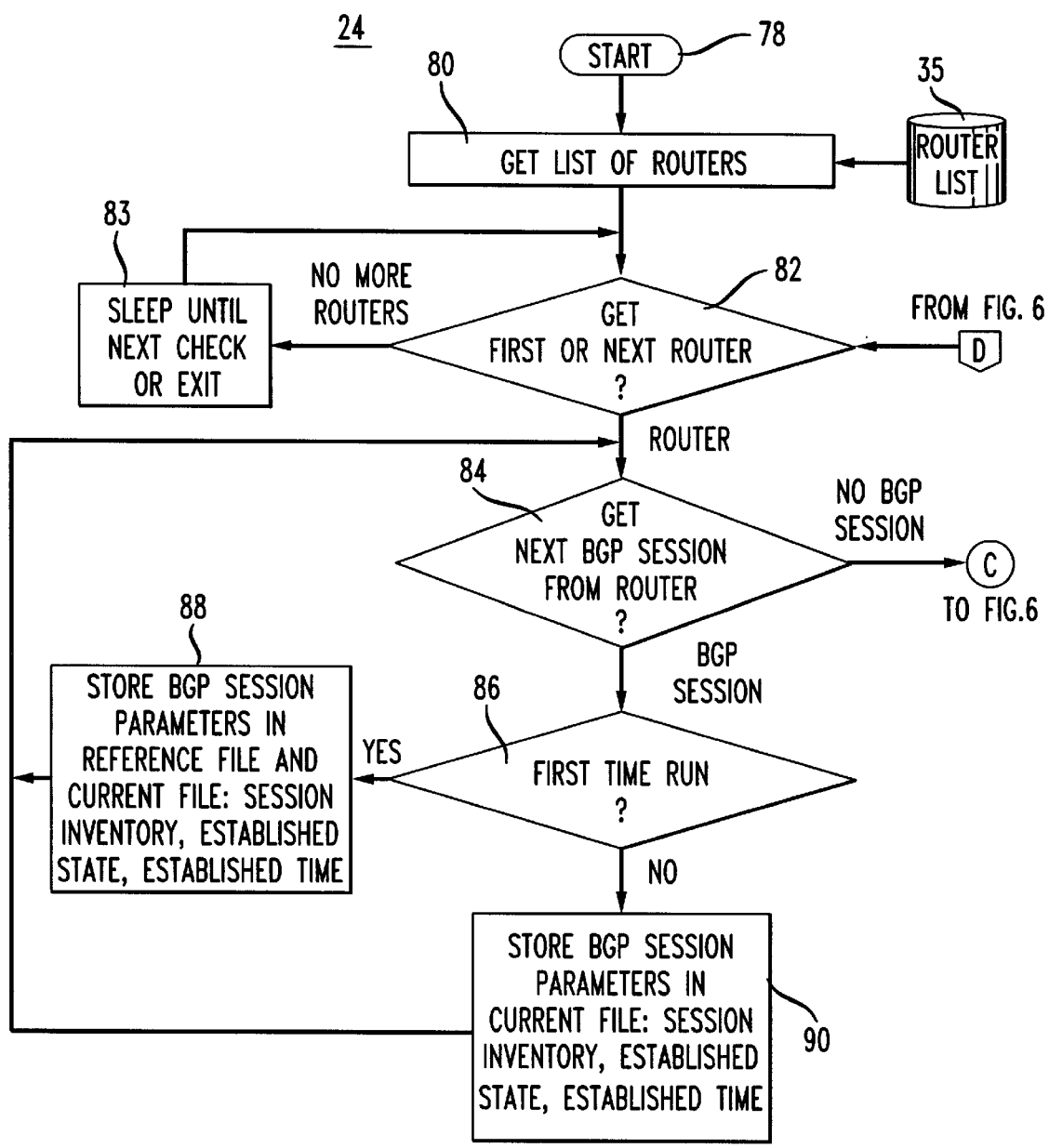

FIGS. 5–7 illustrate in flow-chart form the details of the bgpchk sub-routine 24 executed by the monitoring system 21 of FIG. 1 to monitor the Border Gateway Protocol sessions. As seen in FIG. 5, the bgpchk sub-routine commences upon execution of a start step (step 78) immediately after which, step 80 is executed during which the monitoring system 21 of FIG. 1 acquires a list of all routers in the network 10 (e.g., routers 18$_1$ and 18$_2$ of FIG. 1) by accessing a router list maintained in database 35. After acquiring the router list, the monitoring system 21 of FIG. 1 examines each successive router on the list during step 82 of FIG. 5. Upon initial execution of step 82, the monitoring system 21 of FIG. 1 examines the first router on the list, and upon each subsequent execution of step 82, the monitoring system examines the next listed router. If, upon execution of step 82, there are no more routers on the list, then step 83 is executed, whereupon the monitoring system 21 of FIG. 1 enters a "sleep" mode for a prescribed interval prior to re-executing step 82. (Note that the monitoring system 21 of FIG. 1 could also exit the bgpchk sub-routine during step 83 of FIG. 5 if no additional routers are found.)

Following execution of step 82 of FIG. 5, the monitoring system 21 of FIG. 1 acquires the next BGP session for the router undergoing examination during step 84. Upon initial execution of step 84, the monitoring system acquires the first BGP session and upon subsequent execution, then acquires the next such session. Assuming that a BGP session exists, the monitoring system 21 of FIG. 1 then executes step 86 of FIG. 5 to determine whether the bgpchk sub-routine is undergoing initial execution. Upon initial execution of the bgpchk sub-routine, the monitoring system executes step 88 following step 86 and stores the BGP session parameters, including the session inventory, established state, and established time in both the Reference File and Current file. However, upon the second and subsequent execution of the bgpchk sub-routine, then step 90 is executed following step 86 and the monitoring system 21 of FIG. 1 stores the BGP parameters, including the session inventory established state, and established time in the Current file only.

If there are no subsequent BGP sessions for acquisition during step 84 of FIG. 5, then the monitoring system 21 of FIG. 1 follows branch "B" and executes step 92 of FIG. 6. and acquires the next BGP session from the Current file. Upon initial execution of step 92, the monitoring system 21 of FIG. 1 acquires the first BGP session from the Current file, and upon each subsequent execution of step 92, the monitoring system acquires the next BGP session from the Current file. Following step 92 of FIG. 6, the monitoring system 21 of FIG. 1 executes step 94 of FIG. 6 and compares the parameters of the BGP session obtained during step 92 from the Current file to the parameters of the BGP sessions stored in the Reference file. If the BGP session acquired during step 92 does not exist in the Reference file, then the monitoring system 21 of FIG. 1 executes step 96 and generates an alarm to alert the network manager of a new BGP session. Thereafter, the new BGP session is added to the Reference file during step 98 prior to re-executing step 92.

If the monitoring system 21 of FIG. 1 finds during step 94 that the BGP session acquired from the current file during step 92 exists in the Reference file, then the monitoring system follows branch "C" and commences execution of step 100 of FIG. 7. During step 100, the monitoring system 21 of FIG. 1 checks whether any change in state occurred between the BGP session in the Current file and corresponding BGP session in the Reference file. If no change in state occurred, the monitoring system 21 of FIG. 1 executes step 102 of FIG. 7 and checks whether the established time for the BGP session in the current file at least equals or exceeds the established time for the corresponding BGP session in the Reference file. If so, then the monitoring system 21 of FIG. 1 follows branch "B" and re-executes step 92 of FIG. 6. Otherwise, if the monitoring system finds during step 102 that the established time for the BGP session in the current file does not equal or exceed the established time for the corresponding BGP session in the Reference file, then, the monitoring system 21 of FIG. 1 executes step 104 of FIG. 7 and generates an alarm indicating a BGP Session Reset Fault before following branch "B" and re-executing step 92 of FIG. 6.

During step 100 of FIG. 7, the monitoring system 21 of FIG. 1 may detect that the BGP session in the Current file changed state relative to the corresponding BGP state in the Reference file. If so, then the monitoring system 21 of FIG. 1 executes step 106 of FIG. 7 to determine whether the state of the BGP session is established in the Current file. If the state of the BGP session is not established, the monitoring system 21 of FIG. 1 generates an alarm during step 108 indicating a BGP Session State Fault. Otherwise, the monitoring system 21 of FIG. 1 generates an alarm during step 110 indicating a BGP Session State Clear. Following steps 108 or 110, the monitoring system 21 of FIG. executes step 102 as discussed previously.

As may be appreciated, during execution of the steps 92–110, the monitoring system 21 of FIG. 1 compares the present BGP sessions, as of the most recent execution of the bgpchk sub-routine, to the BGP sessions recorded upon the previous execution of the bgpchk sub-routine. A BGP session that appeared after initial execution of the bgpchk sub-routine represents a new BGP session that must be added to the Reference file. Further, differences between the BGP session in the Current file, and the corresponding BGP session in the Reference file also will give rise to an alarm.

Returning to FIG. 6, ultimately, after re-executing step 92, the monitoring system 21 of FIG. 1 will exhaust all of the BGP sessions in the Current file, whereupon the monitoring system executes step 112 and acquires a next BGP session from the Reference file. (Upon initial execution of step 112, the monitoring system 21 of FIG. 1 acquires the first BGP session from the Reference file, and upon each subsequent execution of step 112, the monitoring system acquires the next BGP session from the Reference file.) Should no more BGP sessions exist in the Reference file, then the monitoring system 21 follows branch "A" and returns to step 82 of FIG. 5. Following step 112 of FIG. 6, the monitoring system 21 of FIG. 1 checks during step 114 whether the BGP session acquired during step 112 from the Reference file exists in the Current file. If the BGP session exists, then the monitoring system re-executes step 112 to get the next BGP session. If the BGP session acquired during step 112 from the Reference file does not exist in the Current file, then following step 114, the monitoring system 21 of FIG. 1 generates an alarm during step 116 of FIG. 6 to alert the network manager of a missing BGP session. Thereafter, the monitoring system 21 of FIG. 1 deletes the BGP session from the Reference file during step 118.

As may be appreciated, during steps 112–118 of FIG. 6, the monitoring system 21 of FIG. 1 compares the BGP sessions in the Reference file to the BGP sessions in the Current file. Any BGP session in the Reference file that does not exist in the Current file implies a missing BGP session that will give rise to an alarm.

Figure 10:
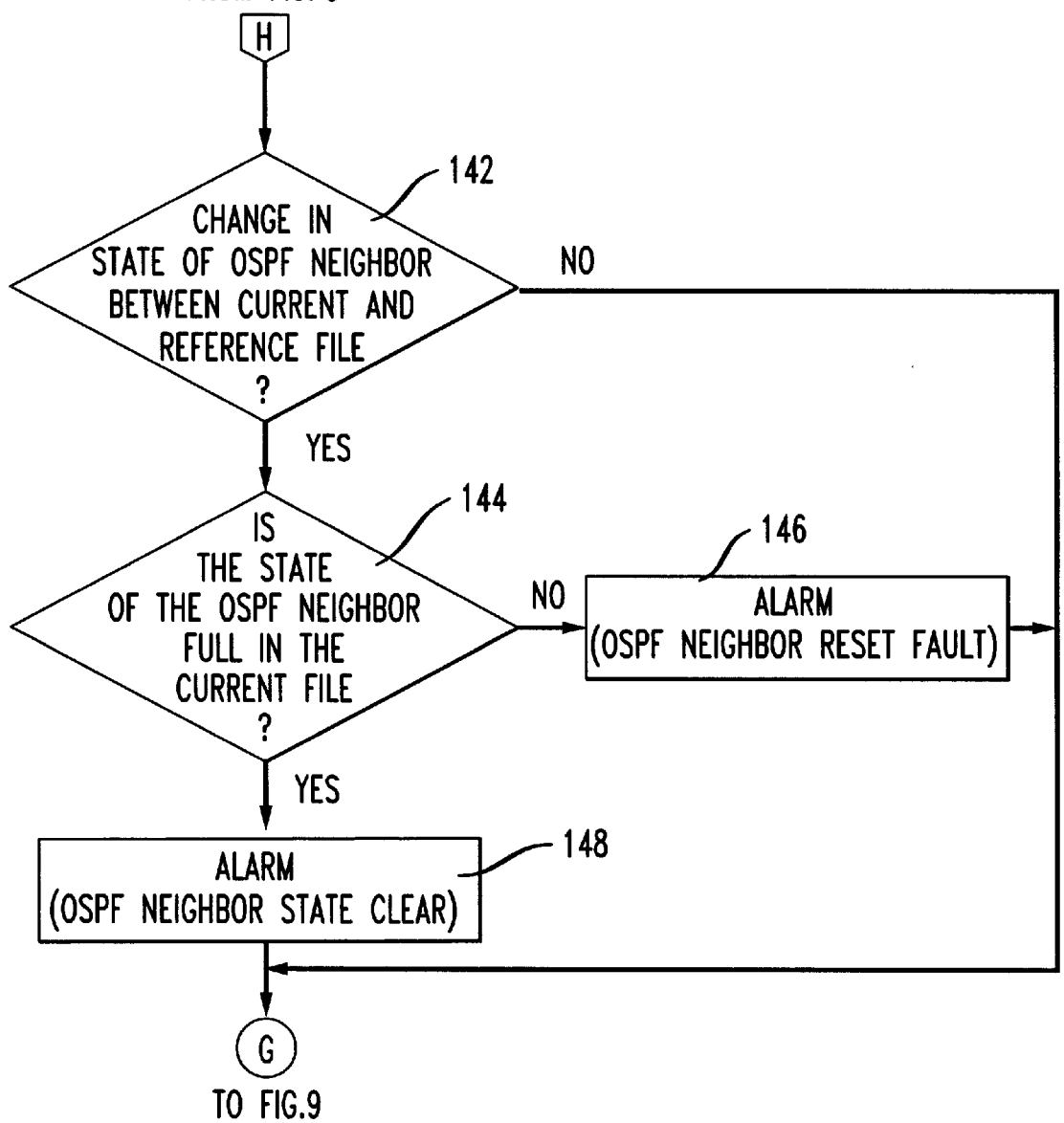

FIGS. 8–10 illustrate in flow-chart form the details of the ospfchk sub-routine 26 executed by the monitoring system 21 of FIG. 1 to monitor the Open Shortest Path First (OSPF) adjacencies. As seen in FIG. 8, the ospfchk sub-routine commences upon execution of a start step (step 120). Immediately after the start step, the monitoring system 21 of FIG. 1 executes step 122 and acquires a list of all routers in the network 10 (e.g., routers $18_1$, and $18_2$ of FIG. 1) by accessing a router list maintained in database 35. After acquiring the router list, the monitoring system 21 of FIG. 1 examines each successive router from the list during step 124 of FIG. 8. Upon initial execution of step 124, the monitoring system 21 of FIG. 1 examines the first router on the list, and upon each subsequent execution of step 124, the monitoring system examines the next successive router. If, upon execution of step 124, there are no more routers on the list, then step 125 is executed, whereupon the monitoring system 21 of FIG. 1 enters a "sleep" mode for a prescribed interval prior to re-executing step 82. (Note that the monitoring system 21 of FIG. 1 could also exit the ospfchk sub-routine during step 125 of FIG. 8 if no additional routers are found.)

Following execution of step 124 of FIG. 8, the monitoring system 21 of FIG. 1 executes step 126 and acquires the next OSPF neighbor information for the router undergoing examination. Upon initial execution of step 126, the monitoring system 21 acquires the first OSPF neighbor and thereafter acquires each subsequent OSPF neighbor. Assuming that an OSPF Neighbor exists, the monitoring system 21 of FIG. 1 then executes step 128 of FIG. 8 and determines whether the ospfchk sub-routine is undergoing initial execution. Upon initial execution of the ospfchk sub-routine, the monitoring system executes step 130 of FIG. 8 following step 128 and stores the OSPF neighbor parameters, including the neighbor inventory and neighbor state in both the Reference File and Current file. However upon the second and subsequent execution of the ospfchk sub-routine, then step 132 is executed following step 128 and the monitoring system 21 of FIG. 1 stores the OSPF neighbor parameters, including the neighbor inventory and neighbor state in the Current file only.

If there are no additional OSPF neighbors for acquisition during step 126 of FIG. 8, then the monitoring system 21 follows branch "B" and executes step 134 of FIG. 9. and acquires the next OSPF neighbor from the Current file. (Upon initial execution of step 134, the monitoring system 21 of FIG. 1 acquires the first OSPF neighbor session from the Current file, and upon each subsequent execution of step 134, the monitoring system acquires the next OSPF session from the Current file.) Following step 134, the monitoring system 21 of FIG. 1 executes step 136 of FIG. 9 and compares the OSPF neighbor obtained during step 134 from the Current file to the corresponding OSPF neighbor stored in the Reference file. If the OSPF neighbor acquired during step 134 does not exist in the Reference file, then the monitoring system 21 of FIG. 1 executes step 138 and generates an alarm to alert the network manager of a new OSPF neighbor. Thereafter, the OSPF neighbor is added to the Reference file during step 140 prior to re-executing step 134.

If the monitoring system 21 of FIG. 1 finds during step 136 of FIG. 9 that the OSPF neighbor exists in the Reference file, then the monitoring system follows branch "C" and commences execution of step 142 of FIG. 10. During step 142, the monitoring system 21 checks whether any change in state exists between the OSPF neighbor in the Current file and the corresponding OSPF neighbor in the Reference file. If no change in state occurred, the monitoring system 21 of FIG. 1 follows branch B and re-executes step 134 of FIG. 9.

Otherwise, if a change in state occurred, the monitoring system 21 of FIG. 1 executes step 144 of FIG. 10 and checks whether the state of the OSPF neighbor is full in the Current file. If the OSPF neighbor state is not full, the monitoring system 21 of FIG. 1 generates an alarm during step 146 to alert the network manager of an OSPF Neighbor State Fault before following branch "B" and re-executing step 134 of FIG. 9. Otherwise, when the monitoring system 21 of FIG. 1 detects full OSPF neighbor state during step 144, the monitoring system generates an alarm during step 148 to indicate an OSPF Neighbor State Clear before following branch "B" and re-executing step 134 of FIG. 9.

As may be appreciated, during execution of the steps 134–148, the monitoring system 21 of FIG. 1 compares the present OSPF neighbors, as of the most recent execution of the ospfchk sub-routine, to the OSPF sessions recorded upon the previous execution of the ospfchk sub-routine. An OSPF neighbor found after previous execution of the ospfchk sub-routine represents a new OSPF neighbor that must be added to the Reference file. Further, differences between the OSPF neighbor state, as recorded in the Current file, and the corresponding OSPF neighbor state in the Reference file also will give rise to an alarm.

Returning to FIG. 9, ultimately, after re-executing step 134, the monitoring system 21 of FIG. 1 will exhaust all of the OSPF neighbors in the Current file, whereupon the monitoring system executes step 150 and acquires a next OSPF neighbor from the Reference file. Upon initial execution of step 150 of FIG. 9, the monitoring system 21 of FIG. 1 acquires the OSPF neighbor from the Reference file, and upon each subsequent execution of step 150, the monitoring system acquires the next OSPF neighbor. Should no more OSPF neighbors exist in the Reference file, then the monitoring system 21 follows branch "A" and returns to step 124 of FIG. 8. Following step 150 of FIG. 9, the monitoring system 21 of FIG. 1 checks during step 152 whether the OSPF neighbor acquired during step 150 from the Reference file exists in the Current file. If the OSPF neighbor in the Reference file exists in the Current file, then the monitoring system re-executes step 150 to get the next OSPF neighbor. If the OSPF neighbor acquired from the Reference file during step 150 of FIG. 9 does not exist in the Current file, then the monitoring system 21 of FIG. 1 generates an alarm during step 154 of FIG. 9 to alert the network manager of a missing OSPF neighbor. Thereafter, the monitoring system 21 of FIG. 1 deletes the OSPF neighbor from the Reference file during step 156.

As may be appreciated, during steps 150–156 of FIG. 9, the monitoring system 21 of FIG. 1 compares the OSPF neighbors in the Reference file to the OSPF neighbors in the Current file. Any OSPF neighbor in the Reference file that does not exist in the Current file implies a missing OSPF neighbor that will give rise to an alarm.

The foregoing provides a technique for detecting and isolating customer connectivity troubles by monitoring the routers in the network to detect missing and new routes, as well as missing and new BGP sessions and OSPF neighbors as well as the change in status of these BGP sessions and OSPF neighbors.

The above-described embodiments are merely illustrative of the principles of the invention. Those skilled in the art may make various modifications and changes that will embody the principles of the invention and fall within the spirit and scope thereof.

What is claimed is:

1. A method for detecting and isolating connectivity troubles in a data network that includes links extending between routers that route traffic between at least one data source and at least one data destination in accordance with route destinations stored in the routing tables in the routers as a consequence of one of a Border Gateway Protocol Session and a Open Shortest Path First Adjacency stored in each router, the method comprising the steps of:

(a) examining the routing table in each router to detect an erroneous route destination; and if so, then generating an alarm indicative of such an error;

(b) examining each router to detect an erroneous Border Gateway Protocol (BGP) session, and if so, then generating an alarm indicative of such error; and (c) examining each router to detect an erroneous Open Shortest Path First (OSPF) adjacency, and if so, then generating an alarm indicative of a such error.

2. The method according to claim 1 wherein steps (a), (b) and (c) are repeated.

3. The method according to claim 1 wherein an erroneous route destination is detected when a predetermined route destination is not found within a routing table in a router.

4. The method according to claim 2 wherein an erroneous route destination is detected when a new route destination is found in a routing table that was not previously detected.

5. The method according to claim 1 wherein an erroneous BGP session is detected if a prescribed BGP session is not found in a router.

6. The method according to claim 2 wherein an erroneous BGP session is detected when a new BGP session is found in a routing router that was not previously detected.

7. The method according to claim 1 wherein an erroneous OSPF adjacency is detected if a prescribed OSPF adjacency is not found in a router.

8. The method according to claim 2 wherein an erroneous OSPF adjacency is detected when a new OSPF adjacency is found in a router that was not previously detected.

9. The method according to claim 2 including the steps of:

storing route destination information, BGP session information, and OSPF adjacency information in both a Reference file and a Current file upon initial execution of steps (a), (b) and (c) and storing route destination information, BGP session information, and OSPF adjacency information in a Current file upon each subsequent execution of steps (a), (b) and (c).

10. The method according to claim 9 wherein an erroneous route destination is detected when a predetermined route destination is found within one but not both of the Current and Reference files.

11. The method according to claim 9 wherein an erroneous BGP session is detected when a BGP session is found within one but not both of the Current and Reference files.

12. The method according to claim 9 wherein an erroneous OSPF adjacency is detected when an OSPF adjacency is found within one but not both of the Current and Reference files.

13. Apparatus for detecting and isolating connectivity troubles in a data network that includes links extending between routers that route traffic between at least one data source and at least one data destination in accordance with route destinations stored in the routing tables in the routers as a consequence of one of a Border Gateway Protocol Session and an Open Shortest Path First Adjacency stored in each router, the apparatus comprising a processor for (a) examining the routing table in each router to detect an erroneous route destination; and if so, then generating an alarm indicative of such an error;

(b) examining each router to detect an erroneous Border Gateway Protocol (BGP) session, and if so, then generating an alarm indicative of such error; and (c) examining each router to detect an erroneous Open Shortest Path First (OSPF) adjacency, and if so, then generating an alarm indicative of a such an error.

14. The apparatus according to claim 13 wherein the processor includes:

a Current file for storing route destination information, BGP session information, and OSPF adjacency information upon initial examination of each router and its routing table; and a Reference file for storing route destination information, BGP session information, and OSPF adjacency information upon each subsequent examination of each router and its routing table.

15. The apparatus according to claim 14 wherein the processor detects an erroneous route destination by checking whether a predetermined route destination is found within one but not both of the Current and Reference files.

16. The apparatus according to claim 14 wherein the processor detects an erroneous BGP session by checking whether a BGP session is found within one but not both of the Current and Reference files.

17. The apparatus according to claim 14 wherein the processor detects an erroneous OSPF adjacency by checking whether an OSPF adjacency is found within one but not both of the Current and Reference files.

* * * * *